(12) United States Patent
Ben-Yishay et al.

(10) Patent No.: US 8,238,647 B2
(45) Date of Patent: Aug. 7, 2012

(54) METHOD AND SYSTEM FOR DEFECT DETECTION

(75) Inventors: Michael Ben-Yishay, Natanya (IL); Ophir Gvirtzer, Rehovot (IL)

(73) Assignee: Applied Materials Israel, Ltd., Rehovot (IL)

( * ) Notice: Subject to any disclaimer, the term of this patent is extended or adjusted under 35 U.S.C. 154(b) by 0 days.

(21) Appl. No.: 13/170,037

(22) Filed: Jun. 27, 2011

(65) Prior Publication Data

US 2011/0255774 A1   Oct. 20, 2011

Related U.S. Application Data

(62) Division of application No. 11/831,675, filed on Jul. 31, 2007, now Pat. No. 7,970,201.

(60) Provisional application No. 60/820,924, filed on Jul. 31, 2006.

(51) Int. Cl.
*G06K 9/56* (2006.01)
*G06K 9/40* (2006.01)

(52) U.S. Cl. .................. 382/149; 382/205; 382/274

(58) Field of Classification Search .................. 382/149, 382/303, 308, 260, 264, 270, 263, 299, 302, 382/304, 205, 261, 274, 242, 236; 250/200, 250/206, 214 R, 214 C, 214 A; 358/534, 358/3.08, 1.9, 3.19, 518, 536, 523, 1.15, 358/519, 451, 528, 465, 3.01

See application file for complete search history.

(56) References Cited

U.S. PATENT DOCUMENTS

| | | | | |
|---|---|---|---|---|
| 4,659,220 | A | * | 4/1987 | Bronte et al. .............. 356/237.5 |
| 4,791,675 | A | | 12/1988 | Deering et al. |
| 5,777,729 | A | * | 7/1998 | Aiyer et al. ................ 356/237.1 |
| 5,907,628 | A | * | 5/1999 | Yolles et al. ................... 382/149 |
| 5,982,921 | A | * | 11/1999 | Alumot et al. ................ 382/145 |
| 7,133,548 | B2 | | 11/2006 | Kenan et al. |
| 7,155,366 | B2 | * | 12/2006 | Lee et al. ...................... 702/182 |
| 7,274,825 | B1 | | 9/2007 | Lee et al. |
| 7,528,943 | B2 | | 5/2009 | Brown et al. |
| 7,570,800 | B2 | | 8/2009 | Lin et al. |
| 7,711,177 | B2 | | 5/2010 | Leslie et al. |

OTHER PUBLICATIONS

Applied Materials Israel, Ltd; JP Application No. 2007-199482; Official Action dated Dec. 1, 2011; 8 pages.
Applied Materials Israel, Ltd; CN Application No. 200710142877.4; Official Action dated Jan. 31, 2011; 14 pages.

* cited by examiner

*Primary Examiner* — Sheela Chawan
(74) *Attorney, Agent, or Firm* — Tarek N. Fahmi, APC

(57) ABSTRACT

A system, method and computer program product for defect detection, the method includes: (i) retrieving a second pixel of a second image that corresponds to a tested pixel of a first image of the object; wherein the first and second images were obtained using different acquisition methods; (ii) searching a third pixel of the second image such that a neighborhood of the second pixel is similar to a neighborhood of the third pixel; (iii) retrieving a fourth pixel of the first image that corresponds to the third pixel; and (iv) comparing between the tested pixel and the fourth pixel.

10 Claims, 10 Drawing Sheets

METHOD AND SYSTEM FOR DEFECT DETECTION

RELATED APPLICATIONS

This is a DIVISIONAL of U.S. patent application Ser. No. 11/831,675, filed Jul. 31, 2007, now U.S. Pat. No. 7,970,201 B2 which claims the priority of U.S. provisional patent Ser. No. 60/820,924, filed Jul. 31, 2006.

FIELD OF THE INVENTION

This invention is generally in the field of automatic optical inspection of patterned articles, such as semiconductor wafers, printed circuit boards and reticles (also referred to as masks).

BACKGROUND OF THE INVENTION

Modern microelectronic devices are commonly produced using a photolithographic process. In this process, a semiconductor wafer is first coated with a layer of a photoresist. This photoresist layer is then exposed to illuminating light using a mask and subsequently developed. After the development, non-exposed photoresist is removed, and the exposed photoresist produces the image of the mask on the wafer. Thereafter, the uppermost layer of the wafer is etched. Thereafter, the remaining photoresist is stripped. For multilayer wafers, the above procedure is then repeated to produce subsequent patterned layers.

Increasing the number of components in microelectronic circuits produced using the above photolithographic process requires the use of very high resolution images in photoresist exposure.

It should be appreciated by those skilled in the art that to produce an operational microelectronic circuit, a mask must be as defect-free as possible, preferably completely defect-free. Therefore, mask inspection tools are needed to detect various defects in the masks that can potentially reduce the microelectronic circuit fabrication yields.

Certain kinds of mask defects (such as extra pattern, missing pattern or particles can be detected by various inspection methods. A well known defect detection technique is known as die to die comparison. Die to die comparison involves comparing an image of a die to an image of another die. Die to die comparison is not effective in single die masks or in non-die areas of a mask.

There is a need to provide systems and methods for defect detection and especially for defect detection of masks.

SUMMARY OF THE INVENTION

A method, computer readable medium and system for defect detection are provided. Conveniently, one or more "tested" pixels are selected and then one or more corresponding "reference" pixels are found. One or more "tested" pixels are compared to the one or more "reference" pixels in order to find possible defects. Mismatch between a tested pixel to a "reference" pixel can indicate that a defect exists.

A method is provided. The method includes: selecting a tested pixel of a first image of an object; retrieving a second pixel of a second image that corresponds to the tested pixel; wherein the first and second images were obtained using different acquisition methods; searching a third pixel of the second image such that a neighborhood of the second pixel is similar to a neighborhood of the third pixel; retrieving a fourth pixel of the first image that corresponds to the third pixel; and comparing between the tested pixel and the fourth pixel.

A computer readable medium having computer-readable code embodied therein for defect detection, the computer-readable code comprising instructions for: selecting a tested pixel of a first image of an object; retrieving a second pixel of a second image that corresponds to the tested pixel; wherein the first and second images were obtained using different acquisition methods; searching a third pixel of the second image such that a neighborhood of the second pixel is similar to a neighborhood of the third pixel; retrieving a fourth pixel of the first image that corresponds to the third pixel; and comparing between the tested pixel and the fourth pixel.

A system for defect detection, the system includes: a memory unit adapted to store information representative of neighborhoods of pixels within a first image of an object and within a second image of an object; and a processor, coupled to the memory unit, the processor is adapted to: select a tested pixel of a first image of an object; retrieve a second pixel of a second image that corresponds to the tested pixel; wherein the first and second images were obtained using a different acquisition method; search a third pixel of the second image such that a neighborhood of the second pixel is similar to a neighborhood of the third pixel; retrieve a fourth pixel of the first image that corresponds to the third pixel; and compare between the tested pixel and the fourth pixel.

A method, the method includes: retrieving a second pixel of a second image that corresponds to a tested pixel of a first image of the object; wherein the first and second images were obtained using different acquisition methods; searching a third pixel of within multiple images of an object such that a neighborhood of the second pixel is similar to a neighborhood of the third pixel; retrieving a fourth pixel of the first image that corresponds to the third pixel; and comparing between the tested pixel and the fourth pixel.

A method for defect detection, the method includes: retrieving a feature of a second image that corresponds to a first feature of a first image of the object; wherein the first and second images were obtained using different acquisition methods; searching a third feature of the second image such that a neighborhood of the second feature is similar to a neighborhood of the third feature; retrieving a fourth feature of the first image that corresponds to the third feature; and comparing between the first feature and the fourth feature.

A method for defect detection, the method includes: retrieving a second pixel of a second image that corresponds to a tested pixel of a first image of the object; wherein the first and second images were obtained using different acquisition methods; searching a golden matching pixel of a second golden image such that a neighborhood of the golden matching pixel is similar to a neighborhood of the third pixel; retrieving a corresponding golden pixel of a first golden image that corresponds to the golden matching pixel; and comparing between the tested pixel and the corresponding golden pixel.

Conveniently, the method includes searching for multiple pixels of the second image that have neighborhoods that match a neighborhood of the second pixel.

Conveniently, the method includes repeating the searching for multiple tested pixels and generating statistics representative of number of pixels found during the searching.

Conveniently, the method includes generating a synthetic image by replacing tested pixels by reference pixels.

Conveniently, the computer-readable code including instructions for: retrieving a second pixel of a second image that corresponds to a tested pixel of a first image of the object;

wherein the first and second images were obtained using different acquisition methods; searching a third pixel of within multiple images of an object such that a neighborhood of the second pixel is similar to a neighborhood of the third pixel; retrieving a fourth pixel of the first image that corresponds to the third pixel; and comparing between the tested pixel and the fourth pixel.

Conveniently, the computer-readable code including instructions for: retrieving a feature of a second image that corresponds to a first feature of a first image of the object; wherein the first and second images were obtained using different acquisition methods; searching a third feature of the second image such that a neighborhood of the second feature is similar to a neighborhood of the third feature; retrieving a fourth feature of the first image that corresponds to the third feature; and comparing between the first feature and the fourth feature.

Conveniently, the computer-readable code including instructions for: retrieving a second pixel of a second image that corresponds to a tested pixel of a first image of the object; wherein the first and second images were obtained using different acquisition methods; searching a golden matching pixel of a second golden image such that a neighborhood of the golden matching pixel is similar to a neighborhood of the third pixel; retrieving a corresponding golden pixel of a first golden image that corresponds to the golden matching pixel; and comparing between the tested pixel and the corresponding golden pixel.

Conveniently, the computer-readable code includes instructions for: searching for multiple pixels of the second image that have neighborhoods that match a neighborhood of the second pixel.

Conveniently, the computer-readable code includes instructions for: repeating the searching for multiple tested pixels and generating statistics representative of number of pixels found during the searching.

Conveniently, the computer-readable code includes instructions for generating a synthetic image by replacing tested pixels by reference pixels.

A system for defect detection, the system includes: a memory unit adapted to store information representative of neighborhoods of pixels within a first image of an object and within a second image of an object; and a processor, adapted to: retrieve a second pixel of a second image that corresponds to a tested pixel of a first image of the object; wherein the first and second images were obtained using different acquisition methods; search a golden matching pixel of a second golden image such that a neighborhood of the golden matching pixel is similar to a neighborhood of the third pixel; retrieve a corresponding golden pixel of a first golden image that corresponds to the golden matching pixel; and compare between the tested pixel and the corresponding golden pixel.

Conveniently, the processor is adapted to search for multiple pixels of the second image that have neighborhoods that match a neighborhood of the second pixel.

Conveniently, the processor is adapted to repeat the searching for multiple tested pixels and generate statistics representative of number of pixels found during the searching.

Conveniently, the processor is adapted to wherein the processor is further adapted to generate a synthetic image by replacing tested pixels by reference pixels.

A system for defect detection, the system includes: a memory unit adapted to store information representative of neighborhoods of pixels within a first image of an object; and a processor, coupled to the memory unit, the processor is adapted to: retrieve a second pixel of a second image that corresponds to a tested pixel of a first image of the object; wherein the first and second images were obtained using different acquisition methods; search a third pixel of within multiple images of an object such that a neighborhood of the second pixel is similar to a neighborhood of the third pixel; retrieve a fourth pixel of the first image that corresponds to the third pixel; and compare between the tested pixel and the fourth pixel.

A system for defect detection, the system includes: a memory unit adapted to store information representative of neighborhoods of pixels within a first image of an object; and a processor, coupled to the memory unit, the processor is adapted to: retrieve a feature of a second image that corresponds to a first feature of a first image of the object; wherein the first and second images were obtained using different acquisition methods; search a third feature of the second image such that a neighborhood of the second feature is similar to a neighborhood of the third feature; retrieve a fourth feature of the first image that corresponds to the third feature; and compare between the first feature and the fourth feature.

BRIEF DESCRIPTION OF THE DRAWINGS

In order to understand the invention and to see how it may be carried out in practice, an embodiment will now be described, by way of non-limiting example only, with reference to the accompanying drawings, in which.

DETAILED DESCRIPTION OF EXEMPLARY EMBODIMENTS

System, method and computer program products are provided. Defects can be found by analyzing two images of the same object that were acquired by using different acquisition methods. These two images can include a reflected image and a transmissive image of the same object.

The system, method and computer program product can be used to find soft defects on non-die areas of a mask.

The method, system and computer program product can detect defects that are visible only on one of the two images.

The method, system and computer program product utilize the following assumption: on a defect-free object, two locations that are similar in one image are also similar in the second image. If a defect appears in one image the similarity between locations is violated.

For simplicity of explanation, the following description will refer to an analysis of a transmitted image and of a reflected image of the same object. Those of skill in the art will appreciate that the method, system and computer program product can be applied mutatis mutandis to other image acquisition methods that differ from each other.

Figure 1:
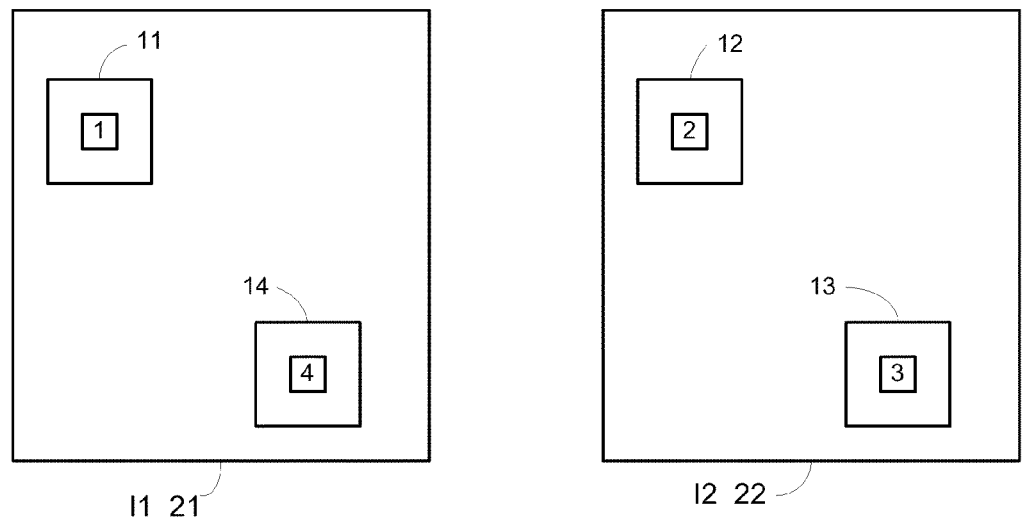
FIG. 1 illustrates two images, few pixels and few neighborhoods of these few pixels according to an embodiment of the invention.
Figure 1:
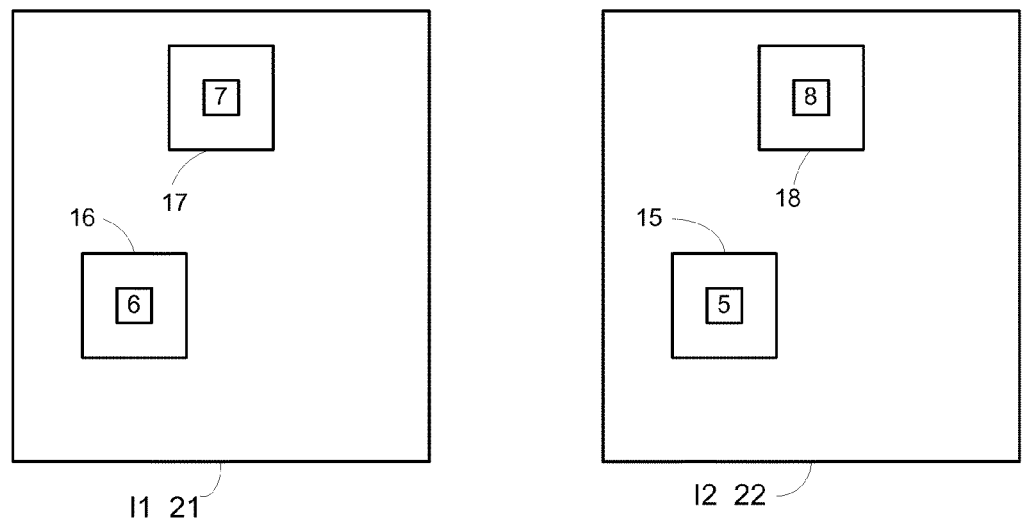

FIG. 1 illustrates two images. Each image includes a very large number of pixels, out of which only few pixels are shown. It is noted that this figure as well as other figures are out of scale.

First image I1 21 includes multiple pixels, such as but not limited to tested pixel 1, fourth pixel 4, sixth pixel 6 and seventh pixel 7. Second image I2 22 includes multiple pixels, such as but not limited to second pixel 2, third pixel 3, fifth pixel 5 and eighth pixel 8.

First till eighth pixels 1-8 are surrounded by multiple neighboring pixels to form multiple neighborhoods 11-18. It is noted that although square shaped neighborhoods are shown other shaped neighborhoods can be used.

It is noted that the terms "second", "third", "fourth", "fifth". "sixth", "seventh" and "eighth" used in conjunction to pixels is for convenience only. These terms do not represent metadata such as a priority level, location related information and the like.

Figure 2:
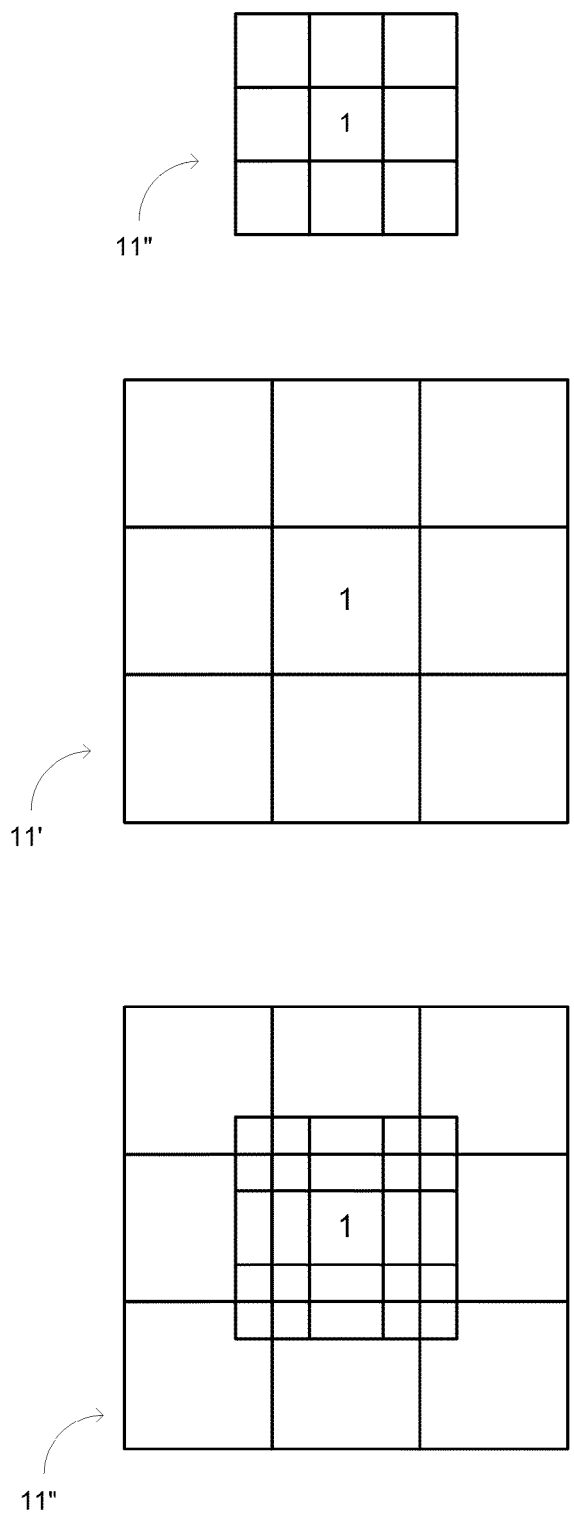
FIG. 2 illustrates few neighborhoods of a pixel according to an embodiment of the invention.

FIG. 2 illustrates few neighborhoods 11, 11' and 11" of pixel 1 according to various embodiments of the invention.

Neighborhood 11" includes nine fine resolution pixels and is centered about tested pixel 1. Neighborhood 11' includes nine coarse resolution pixels and is centered about tested pixel 1. Neighborhood 11 is a combination of the nine coarse resolution pixels of neighborhood 11' and of the nine fine resolution pixels of neighborhood 11".

Conveniently, neighborhoods 11 and 11' are represented by a vector that includes nine elements—an element per pixel. Neighborhood 11 is represented by a vector that includes eighteen elements—an element per pixel. Each vector element can be an intensity value of a single pixel but this is not necessarily so. It is further noted that the shape and, alternatively or additionally, the number of pixels within neighborhoods 11 and 11' can differ from each other.

Using fine resolution pixels provides a better description of a smaller area in relation to using coarse resolution pixels. Representing a neighborhood by both coarse and fine pixels enables to represent a larger area around a pixel while providing more detailed information about the close vicinity of that pixel.

The fine resolution can differ from the coarse resolution by a predefined factor. Factors of about two to four can be selected but this is not necessarily so.

It is further noted that although FIG. 2 illustrates a nine or an eighteen pixel neighborhood that larger (or smaller) neighborhoods can be selected.

It is noted that the first and second images can be images of an area of a mask that includes scribe lines or other regions that can not be analyzed by applying die to die or cell to cell analysis. It is further noted that other locations of the mask can be analyses by other defect detection methods such as die to die comparison, cell to cell comparison and the like.

It is further noted that various areas of the mask can be analyzed by applying simpler detection methods that are designated for special mask areas, such as clear areas, lines, contacts etc. This combination reduces the overall time complexity of the solution.

Figure 3A:
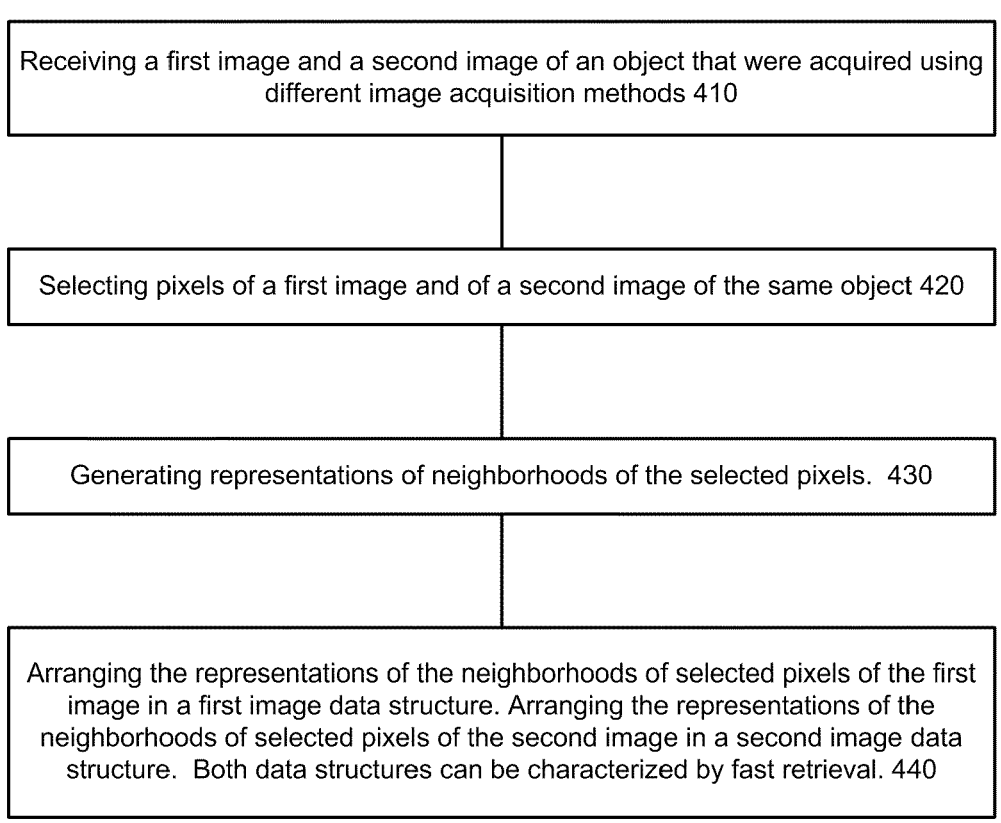
FIG. 3A is a flow chart of a method for generating a first and second image data structures, according to an embodiment of the invention.

FIG. 3A is a flow chart of method 400 for generating a first and second image data structures, according to an embodiment of the invention.

Method 400 starts by stage 410 of receiving a first image and a second image of the same object that were acquired by using different image acquisition methods.

For example, the certain image can be acquired by using high NA optics while the other image can be acquired using low NA optics, the certain image can be acquired by using bright field illumination and the other image can be acquired using dark field illumination, the first and other images can have different pixels sizes, can be characterized by different resolution, the certain image can be acquired while the other image can be a golden image, a selected image (from history), a database representation and the like.

Stage 410 is followed by stage 420 of selecting selected pixels within the first image and within the second image.

The selected pixels can be selected such as to represent features that are expected to appear in the first image. The selection can be executed automatically, manually (in response to user feature definitions or user pixel selection) or semi-automatically. The selection an be responsive to various parameters such as memory size constraints, processor constraints, speed of data structure retrieval, number and complexity of feature of interest, and the like. It is noted that multiple pixels of the second image are also selected and their neighborhoods (or a lower dimension representation of their neighborhoods) are stored in a second image data structure.

The selection can also be responsive to a defect detection method that should be applied to detect various defects. The selection between defect detection methods can be based upon a resource consumption level of the defect detection method and a suitableness of the defect detection method to find a defect. For example, certain areas of the mask can be analyzed by using simpler detection methods that are designated for special mask areas, such as clear areas, lines, contacts etc. In this case pixels that belong to such areas (so called "other pixels) are analyzed using another detection scheme, as illustrated by stage 340.

Stage 420 is followed by stage 430 of generating representations of neighborhoods of the selected pixels. This can include applying a compression scheme that converts M element vectors that represents a neighborhood to an N-dimensional representation. N is smaller than M.

Stage 430 is followed by stage 440 of arranging these neighborhoods (or lower dimension representations of these neighborhoods) at a first image data structure and at a second image data structure. It is noted that the first image data structure and the second image data structure can be characterized by a fast retrieval time. For example, these data structures can be multiple-dimensional KD-trees which support fast nearest-neighbor searching.

Figure 3B:
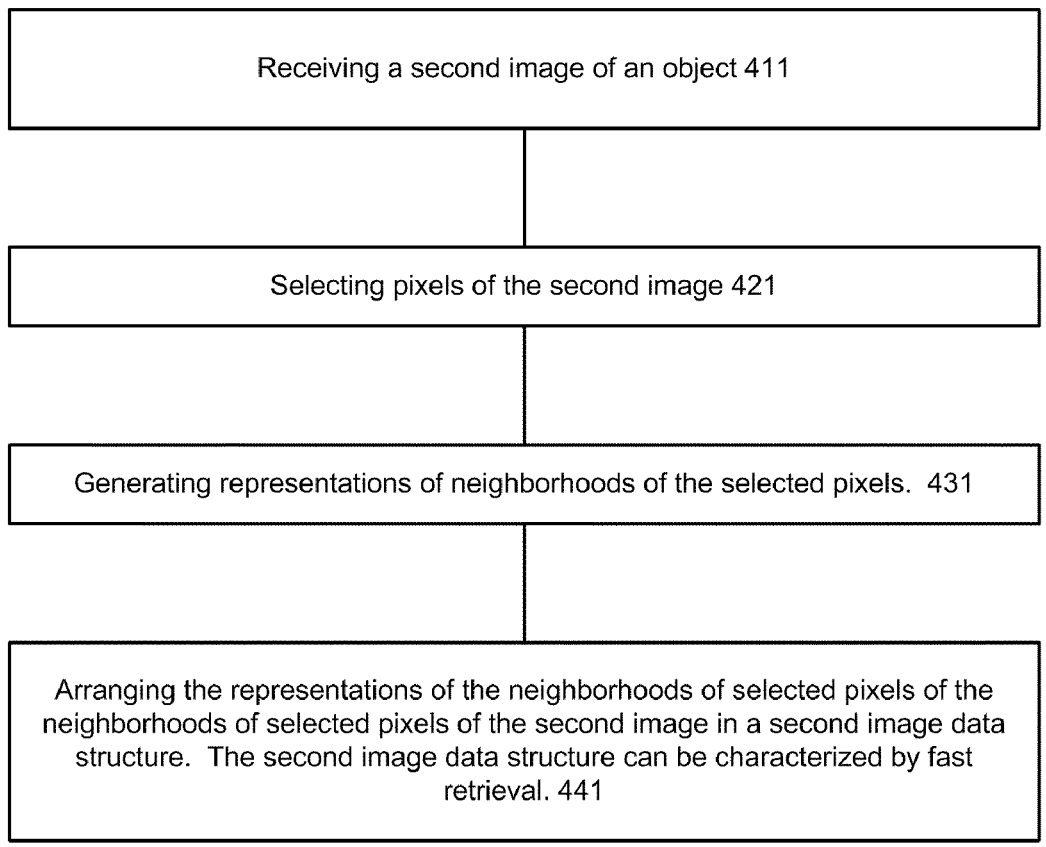
FIG. 3B is a flow chart of a method for generating a first image data structure, according to an embodiment of the invention.

FIG. 3B is a flow chart of method 401 for generating a second image data structure, according to an embodiment of the invention.

Method 401 differs from method 400 by generating only a second image data structure. Method 401 can be applied during defect evaluation of the first image.

Method 401 starts by stage 411 of receiving a second image of an object.

Conveniently, a first image that is being evaluated (especially—defects within the first image are being detected and evaluated) is also present. The first and second images of the same object were acquired by using different image acquisition methods.

Stage 411 is followed by stage 421 of selecting selected pixels within the second image.

Stage 421 is followed by stage 431 of generating representations of neighborhoods of the selected pixels.

Stage 431 is followed by stage 441 of arranging these neighborhoods (or lower dimension representations of these neighborhoods) at a second image data structure. It is noted that the second image data structure can be characterized by a fast retrieval time. For example, these data structures can be multiple-dimensional KD-trees which support fast nearest-neighbor searching.

Figure 4:
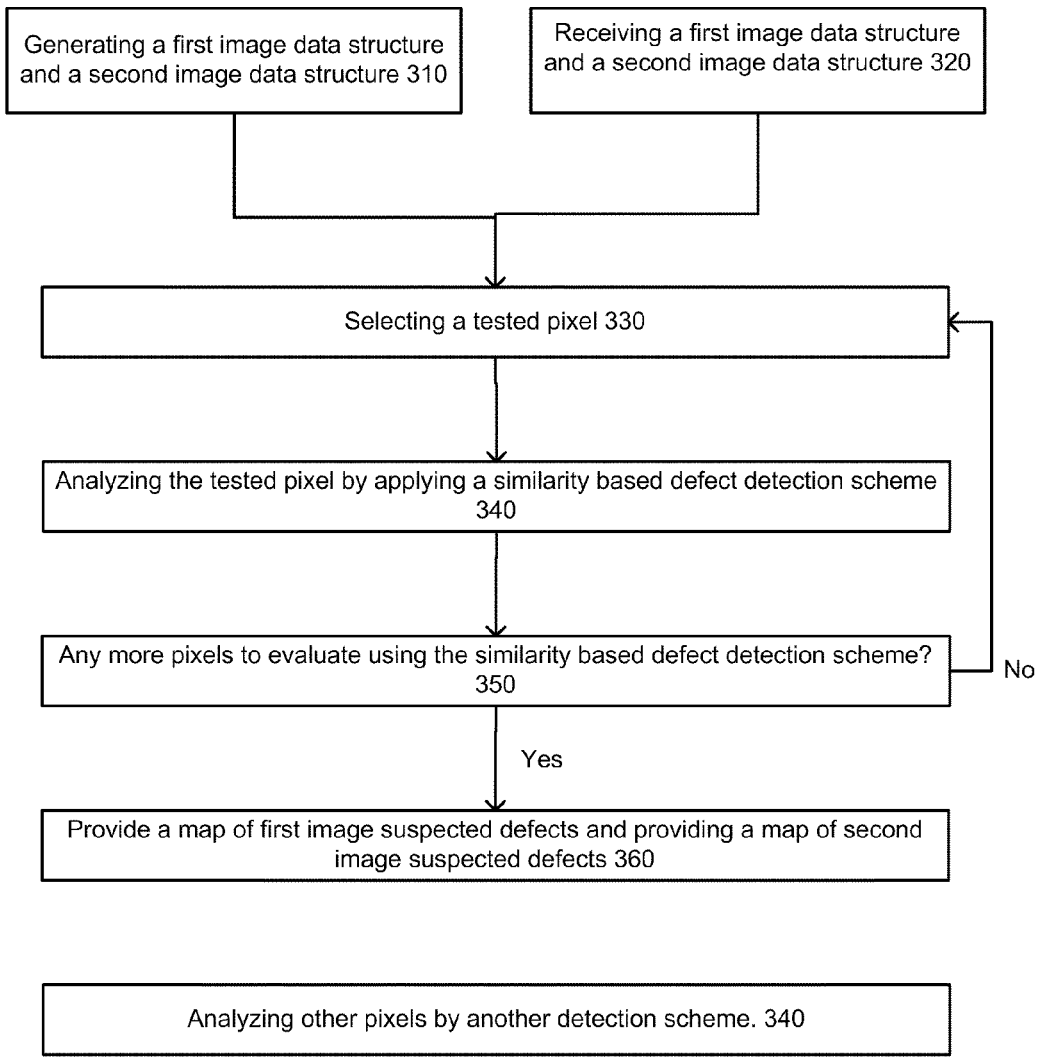
FIG. 4 is a flow chart of a method for defect detection, according to an embodiment of the invention.
Figure 5:
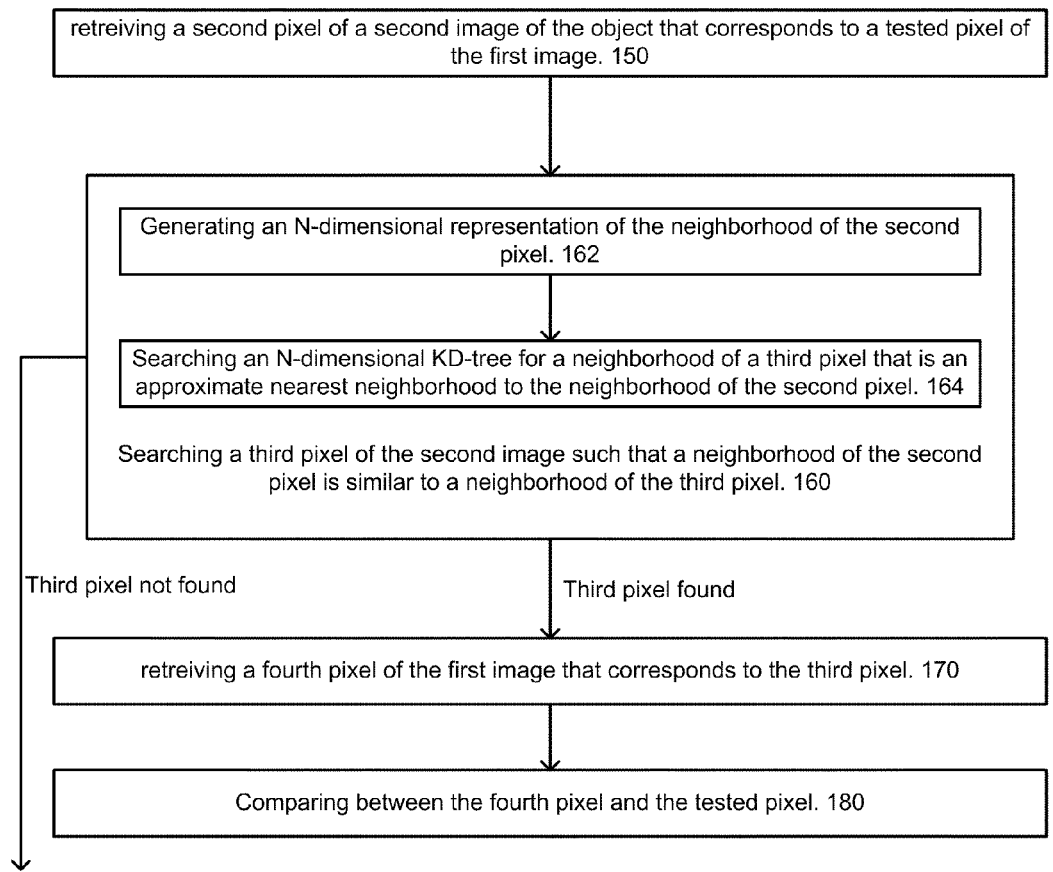
FIGS. 5-6 are flow charts of methods for defect detection, according to an embodiment of the invention.
Figure 6:
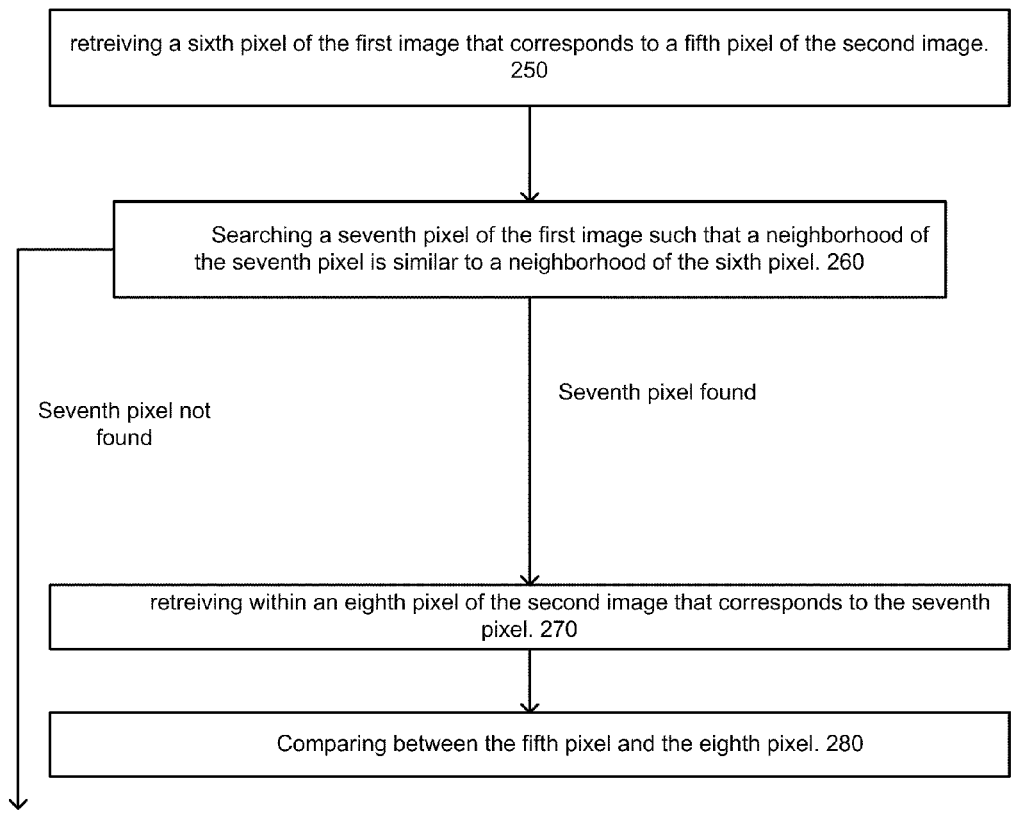

FIG. 4 is a flow chart of method 300 for defect detection, according to an embodiment of the invention. FIGS. 5-6 illustrates methods 100 and 200 for detecting defects according to an embodiment of the invention. FIG. 5 illustrates stages 150-180 that are applied in relation to a tested pixel of a first image. FIG. 6 illustrates stages 250-280 that are executed in relation to a fifth pixel of the second image.

Referring to FIG. 4, method 300 starts by either one of stages 310 and 320.

Stage 310 represent a generation of a first image and second image data structures while stage 320 illustrates a reception of these data structures. Stage 310 can include applying various stages of method 400. Stage 320 can include receiving data structures that were generated by applying various stages of method 400.

After stages 310 and 320 are completed the analysis begins. The analysis is done on a pixel to pixel basis, as illustrated by stage 330 that follows stages 310 and 320.

Stage 330 includes selecting a pixel to evaluate—selecting a "new" tested pixel.

Stage 330 is followed by stage 340 of analyzing the "new" tested pixel by applying a similarity based defect detection scheme. Stage 340 can include applying stages of method 100 (of FIG. 5), and additionally or alternatively, applying stages of method 200 (of FIG. 6).

Stage 340 is followed by stage 350 of checking if more pixels should be examined—"any more pixels to evaluate by applying the similarity based defect detection scheme?".

If the answer is positive then stage 350 is followed by stage 330 of selecting a new tested pixel. Else stage 350 can be followed by stage 360 of providing a map of first image suspected defects and a map of a second image suspected defects. It is noted that method 300 can be applied to find defects in a single image out of the first and second images and in this case the outcome of stage 360 is a single image suspected defects map.

Those of skill in the art will appreciate that the results of the similarity based defect detection scheme can be provided in other manners and that a map is provided as a sample only. The map can include multiple map pixels, each having a value indicative of the difference between pixels of the same image.

Method 100 of FIG. 5 starts by stage 150 of retrieving within the second image a second pixel that corresponds to a tested pixel within the first image.

According to an embodiment of the invention the tested pixel can be selected by a user, by an automatic process and the like. The tested pixel can be selected in view of the expected structure of the mask, potentially defect prone regions. The tested pixel can also represent an arbitrary pixel within the first image. If, for example all pixels within the first image are analyzed then the tested pixel can represent any pixel within the first image.

The first and second pixels should represent that same location within the object. Stage 150 can be preceded by a registration of the first and second images.

Stage 150 is followed by stage 160 of searching a third pixel of the second image such that a neighborhood of the second pixel is similar to a neighborhood of the third pixel. If such a third pixel is not found method 100 can end or a "new" tested pixel can be selected and stages 160-180 can be repeated for this new pixel. If such a third pixel is not found a default comparison result can be generated and stored. Referring to FIG. 1, it is assumed that third pixel 3 having neighborhood 13 is found. Neighborhood 13 of third pixel 3 can be the approximate nearest neighborhood of neighborhood 11 of tested pixel 1.

Stage 160 conveniently includes stages 162 and 164. Stage 162 includes generating an N-dimensional representation of the neighborhood of the second pixel. Stage 164 includes searching an N-dimensional KD-tree for a neighborhood of a third pixel that is an approximate nearest neighborhood of the neighborhood of the second pixel.

It is noted that other data structure other than N-dimensional KD-trees can be searched and that other algorithms that approximate nearest neighbors can be applied.

If such a third pixel is found then stage 160 is followed by stage 170 of retrieving a fourth pixel of the first image that corresponds to the third pixel. The third and fourth pixels should represent that same location within the object.

Stage 170 is followed by stage 180 of comparing between the tested pixel and the fourth pixel. If these pixels are similar to each other then it is assumed that that there is no defect, else (if these pixels are not similar) it is assumed that a defect was found. It is noted that stage 180 can also include comparing between the neighborhoods of the tested pixel and the fourth pixel, comparing between some pixels of these neighborhoods and the like. The comparison can include comparing an intensity of each pixel, an energy of each pixel and the like.

It is noted that a defect can be announced by comparing more than two pixels that represent ideally similar features.

Conveniently, the comparison includes (or is preceded by) a sub-pixel registration between the neighborhoods of the first and fourth pixels and that the neighborhoods can be further processed in order to remove (or reduce) noise, visual artifacts and the like.

It is noted that the same process can be applied on pixels of the second image. It is further noted that in many cases pixels of the first and second images will be evaluated, but this is not necessarily so.

Method 200 of FIG. 6 includes stage stages 250-280 that are analogues to stages 150-180 of method 100.

Method 200 starts by stage 250 of retrieving a sixth pixel of the first image that corresponds to a fifth pixel of the first image.

Stage 250 is followed by stage 260 of searching a seventh pixel of the first image such that a neighborhood of the seventh pixel is similar to a neighborhood of the sixth pixel. If such a seventh pixel is not found method 200 can end or a "new" fifth pixel can be selected and stages 260-280 can be repeated for the new fifth pixel. If such a seventh pixel is not found a default comparison result can be generated and stored.

If such a seventh pixel is found then stage 260 is followed by stage 270 of retrieving within the second image an eighth pixel that corresponds to the seventh pixel. The seventh and eighth pixels should represent that same location within the object.

Stage 270 is followed by stage 280 of comparing between a neighborhood of the fifth pixel and the neighborhood of the eighth pixel. If these neighborhoods are similar to each other then it is assumed that that there is no defect, else (if these neighborhoods are not similar) it is assumed that a defect was found.

Those of skill in the art will appreciate that stages 250-280 can be applied during a defect detection method that is analogues to method 300 of FIG. 4. In this case instead of looking for tested pixels within the first image tested pixels will be searched in the second image.

Figure 7:
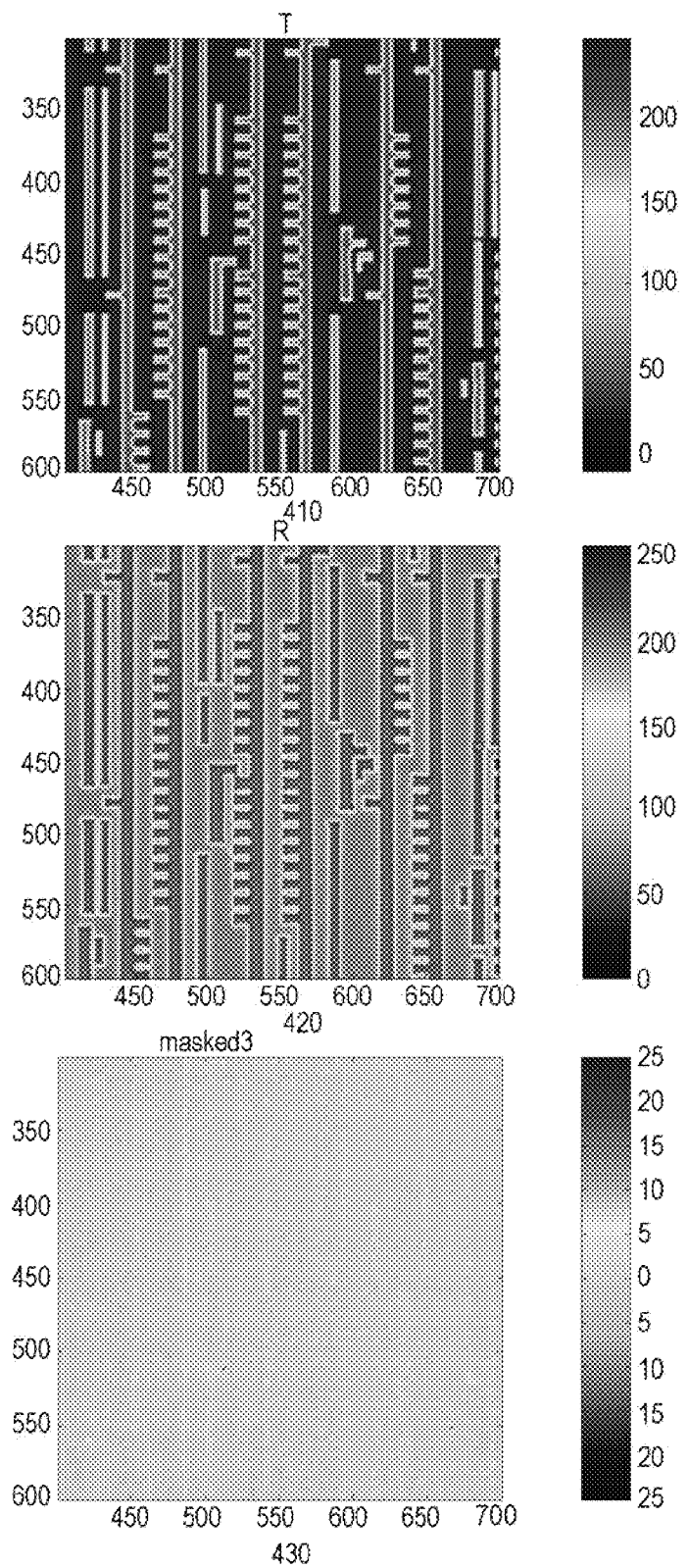
FIG. 7 illustrates a reflective image of a mask, a transmissive image of the mask and a defect map, according to an embodiment of the invention.

FIG. 7 illustrates a transmissive image 410 of a mask, a reflective image 420 and circles that surround suspected defects and map 430 that represents the appliance of method 100 on substantially all the pixels of the reflective image 420.

Figure 8:
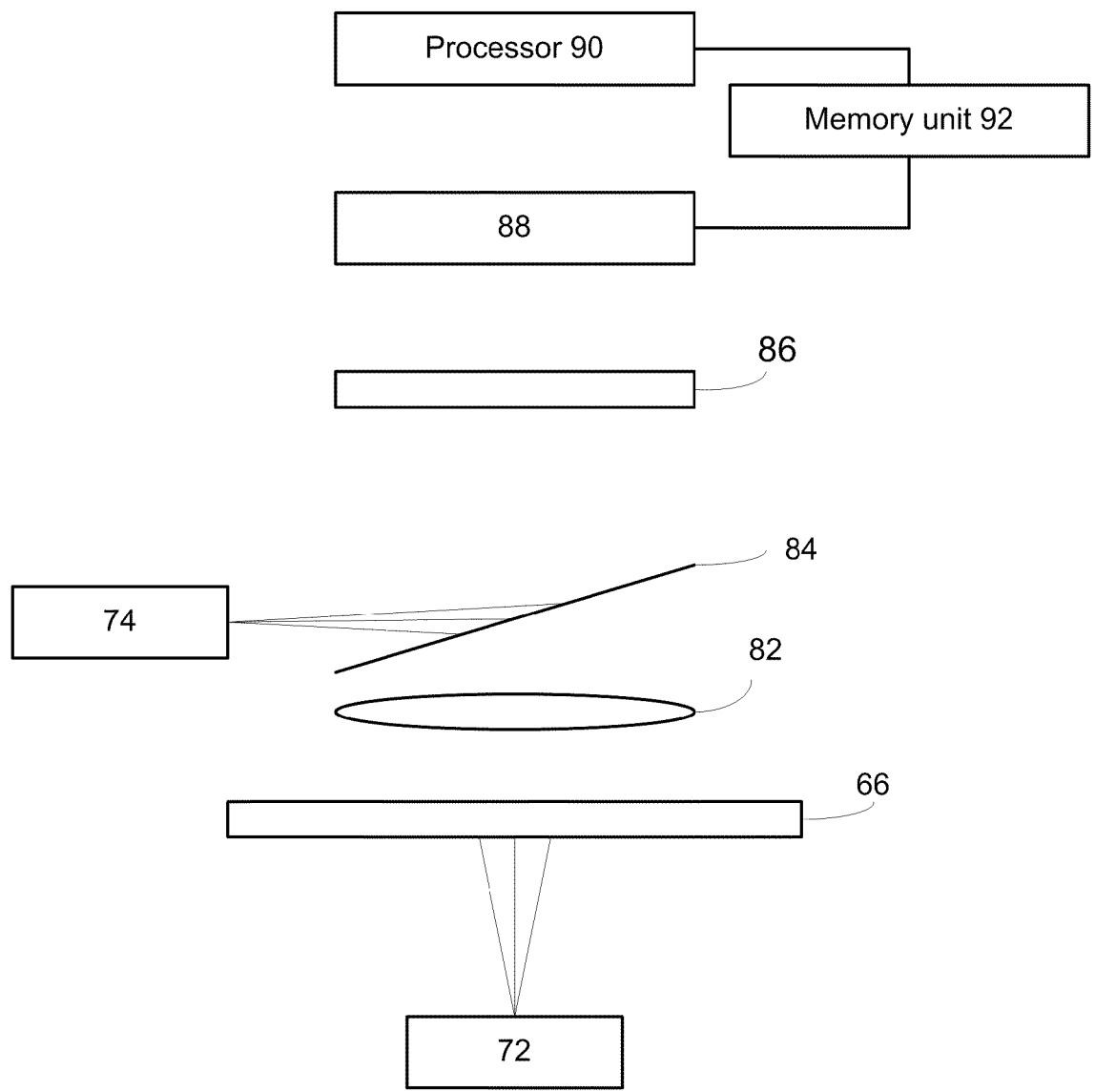
FIG. 8 illustrates a system for detecting defects, according to an embodiment of the invention.

FIG. 8 illustrates system 60 according to an embodiment of the invention. System 60 is capable of acquiring transmissive and reflective images of mask 66 and processing the images by applying a similarity based detection scheme such as method 100, 200 or 300.

It is noted that a processor that is not a part of such a system can apply the similarity based detection scheme, after receiving reflective and transmissive images of the mask.

System 60 includes reflective light source 74, transmissive light source 72, objective lens 82, beam splitter 84, optics 86, detector unit 88, processor 90 and memory unit 92. Additionally or alternatively, a single light source and multiple detectors (above and below mask 60) can be used.

Light from reflective light source 74 is directed, via beam splitter 84 towards mask 60. Light from transmissive light source 72 passes through mask 60. Light (reflected or transmitted—depends upon the light source that is activated) passes through objective lens 82, beam splitter 84 and optics 86 to be detected by detector unit 88. Detection unit 88 can provide frames representative of parts of mask 60. An image of mask 60 or a part of mask 60 can be formed from at least a portion of a frame.

Memory unit 92 can store the images and, additionally or alternatively, store information representative of neighborhoods of pixels within a first image of an object and within a second image of an object.

Processor 90 is connected to memory unit 92. Processor 90 is adapted to: (i) retrieve a second pixel of a second image that corresponds to a tested pixel of a first image of the object: wherein the first and second images were obtained using a different acquisition method; (ii) search a third pixel of the second image such that a neighborhood of the second pixel is similar to a neighborhood of the third pixel; (iii) retrieve a fourth pixel of the first image that corresponds to the third pixel; and compare between the tested pixel and the fourth pixel.

Optics 86 can include an aperture, a focusing lens (such as a tube lens), zoom magnification lens, and another beam splitter (if, for example, detection unit 88 includes multiple spaced apart cameras, as illustrated in U.S. Pat. No. 7,133,548 which is incorporated herein by reference.

Each of the various mentioned above methods can be executed by a computer that executed a computer program stored in a computer readable medium.

The mentioned above description refers to a selection of tested pixels and a comparison of a tested pixel to a reference pixel. It is noted that the invention can be applied mutatis mutandis on features. Thus, a tested feature can be selected, a corresponding feature is retrieved from another image of the object, a similar feature is searched in the other image and once found a reference feature can be retrieved and compared to the tested feature.

The mentioned above description refereed to a comparison of pixels within a first and a second image. According to an embodiment of the invention each image represents a portion of a mask and the similarity based search is not bounded to the second image but rather can be expanded to finding within multiple images of different portions of the reticle a pixel that has similar neighborhoods. Accordingly, a data structure of multiple images can be generated.

The mentioned above description referred to a comparison of pixels within a first and a second image. According to an embodiment of the invention a database or "golden" images are used in order to find defects. A first "golden" image can represent a defect free (ideal) reticle as imaged during an acquisition method that is applied to acquire the first image. A second "golden" image can represent a defect free (ideal) reticle as imaged during an acquisition method that is applied to acquire the second image. Instead of applying the similarity based search within the second image the similarity based search searches for a matching pixel (golden matching pixel) within the second "golden" image that has a neighborhood that is similar to a neighborhood of a second pixel located within the second image. After the golden matching pixel is found a corresponding golden pixel (within the first "golden" image) is retrieved. The location of the golden matching pixel is the same as the location of the corresponding golden pixel. The corresponding golden pixel is then compared to the tested pixel. If these pixels differ from each other (a threshold based decision can be applied) then the tested pixel can represent a defect. In this case the tested pixel is the tested pixel and the corresponding golden pixel is the reference pixel. It is noted that a similar process can be applied when pixels of the second image are evaluated.

Figure 9:
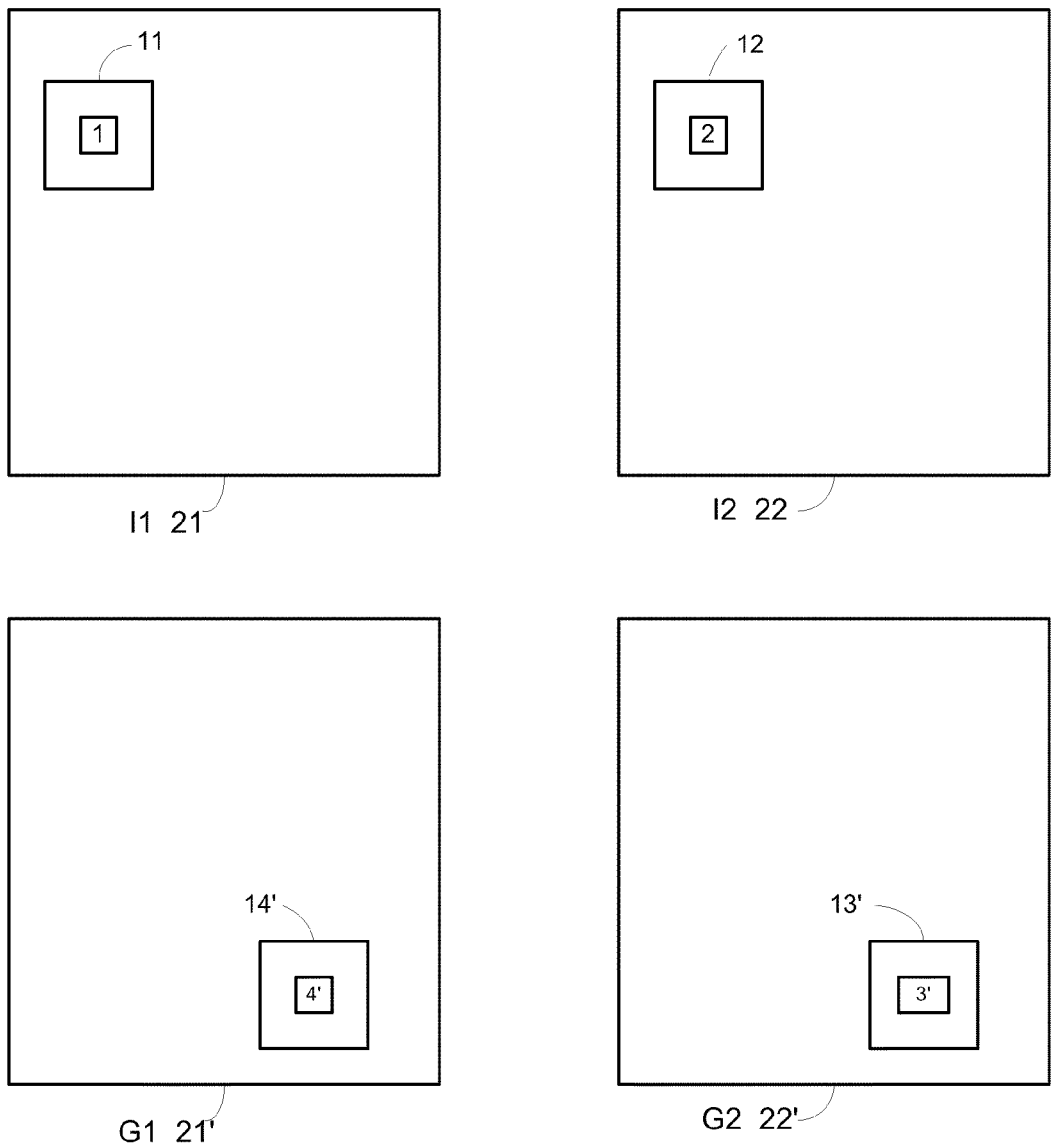
FIG. 9 illustrates four images, few pixels and few neighborhoods of these few pixels according to another embodiment of the invention.

FIG. 9 illustrates first golden image G1 21', second golden image G2 22, first and second pixels 1 and 2 and their neighborhoods 11 and 12, golden matching pixel 3' and its neighborhood 13', corresponding golden pixel 4' and its neighborhood 14'. Tested pixel 1 is selected as a tested pixel. Second pixel 2 is retrieved as being at the same location (in second image I2 22) as tested pixel 1 within first image I1 21. Golden matching pixel 3' (within second golden image G2 22') is found after searching a pixel (within second golden image) that has a similar neighborhood to the neighborhood of second pixel 2. Corresponding golden pixel 4' is retrieved and has the same location (within first golden image G1 21') as the location of Golden matching pixel 3'. Corresponding golden pixel 4' is the reference pixel of tested pixel 1 and is compared to tested pixel in order to detect a defect.

According to an embodiment of the invention the similarity based search can try to locate multiple similar pixels per target pixel. The process can continue by generating statistics representing a relationship between pixels and the number (or other attribute) of similar (reference) pixels.

According to another embodiment of the invention a synthetic image is generated. In this synthetic image reference pixels replace the target pixels and vice verse. Target pixels that do not have similar pixels can be filtered out.

Those skilled in the art will readily appreciate that various modifications and changes can be applied to the embodiments of the invention as hereinbefore described without departing from its scope defined in and by the appended claims.

What is claimed is:

1. A method for defect detection, the method comprising:
retrieving a second pixel of a second image of an object that corresponds to a tested pixel of a first image of the object; wherein the first and second images were obtained using different acquisition methods;
searching a golden matching pixel of a second golden image such that a neighborhood of the golden matching pixel is similar to a neighborhood of the second pixel;
retrieving a corresponding golden pixel of a first golden image that corresponds to the golden matching pixel;
comparing between the tested pixel and the corresponding golden pixel; and
identifying defects in the object based on the comparison, wherein each respective golden matching pixel and golden pixel of a golden image is a pixel of an image representing a defect-free object.

2. The method according to claim 1 further comprising repeating the searching for multiple tested pixels and generating statistics representative of a number of pixels found during the searching.

3. A non-transitory computer readable medium having computer readable code for defect detection embodied therein, the computer-readable code comprising instructions for:

retrieving a second pixel of a second image of an object that corresponds to a tested pixel of a first image of the object; wherein the first and second images were obtained using different acquisition methods;

searching a golden matching pixel of a second golden image such that a neighborhood of the golden matching pixel is similar to a neighborhood of the second pixel;

retrieving a corresponding golden pixel of a first golden image that corresponds to the golden matching pixel;

comparing between the tested pixel and the corresponding golden pixel; and identifying defects in the object based on the comparison, wherein each respective golden matching pixel and golden pixel of a golden image is a pixel of an image representing a defect-free object.

4. The computer readable medium of claim 3 wherein the computer-readable code comprises instructions for: searching for multiple pixels of the second image that have neighborhoods that match a neighborhood of the second pixel.

5. The computer readable medium of claim 4 wherein the computer-readable code comprises instructions for: repeating the searching for multiple tested pixels and generating statistics representative of a number of pixels found during the searching.

6. The computer readable medium of claim 3 wherein the computer-readable code comprises instructions for: generating a synthetic image by replacing tested pixels by reference pixels.

7. A system for defect detection, the system comprising: a memory unit adapted to store information representative of neighborhoods of pixels within a first image of an object and within a second image of the object; and a processor, adapted to: retrieve a second pixel of a second image of the object that corresponds to a tested pixel of a first image of the object; wherein the first and second images were obtained using different acquisition methods;

search a golden matching pixel of a second golden image such that a neighborhood of the golden matching pixel is similar to a neighborhood of the second pixel; retrieve a corresponding golden pixel of a first golden image that corresponds to the golden matching pixel; and compare between the tested pixel and the corresponding golden pixel, wherein each respective golden matching pixel and golden pixel of a golden image is a pixel of an image representing a defect-free object.

8. The system according to claim 7 wherein the processor is adapted to search for multiple pixels of the second image that have neighborhoods that match a neighborhood of the second pixel.

9. The system according to claim 8 wherein the processor is adapted to repeat the searching for multiple tested pixels and generate statistics representative of a number of pixels found during the searching.

10. The system according to claim 7 wherein the processor is adapted to identify defects in the object based on the comparison.

* * * * *